United States Patent Office 2,850,495
Patented Sept. 2, 1958

2,850,495

3,4-DIHYDRO-2-OXO-2H-1,4-BENZOXAZINE-4-ACETIC ACIDS

Bill M. Williams and Edgar C. Britton, Midland, Mich., assignors to The Dow Chemical Company, Midland, Mich., a corporation of Delaware No Drawing. Application November 12, 1957
Serial No. 695,487

6 Claims. (Cl. 260—244)

This invention is concerned with 3,4-dihydro-2-oxo-2H-1,4-benzoxazine-4-acetic acids corresponding to the formula

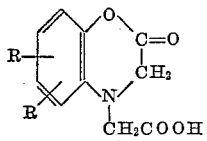

In this and succeeding formulas, each R represents hydrogen, halogen or lower alkyl. The term lower alkyl is employed in the present specification and claims to refer to the alkyl radicals containing from 1 to 4 carbon atoms, inclusive.

The new benzoxazine-4-acetic acid compounds are crystalline solids somewhat soluble in water and many common organic solvents. The compounds are useful as parasiticides, and are adapted to be employed as the toxic constituents of compositions for the control of microorganisms such as *Staphylococcus aureus*. The compounds are also useful as chelating agents.

The new acids of the invention may be prepared by causing monochloroacetic acid to react with a 2-aminophenol corresponding to the following formula

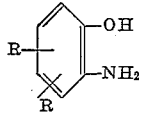

to produce an intermediate condensation product. This intermediate is then reacted with a mineral acid to produce the desired product.

In the first step of the present method, the 2-aminophenol is reacted with chloroacetic acid in the presence of an alkaline reagent such as alkali metal hydroxide and under conditions whereby the reaction mixture is maintained at a pH of from about 6 to about 9 and preferably at a pH of from about 7 to 8. The reaction is carried out in water as reaction medium and preferably in an atmosphere of an inert gas such as nitrogen rather than air to minimize oxidation of the 2-aminophenol reagent. Under these conditions the reaction takes place smoothly at the temperature range of from 80° C. to the boiling point of the reaction mixture with the production of the desired product and hydrogen chloride of reaction. This hydrogen chloride appears in the reaction mixture as alkali metal chloride. Conveniently the reaction may be carried out at the boiling temperature and under reflux. Good results are obtained when employing one molecular proportion of a 2-aminophenol with about two or more molecular proportions of chloroacetic acid and about four or more molecular proportions of alkaline reagent.

In carrying out the first step of the present method, the 2-aminophenol and monochloroacetic acid are dispersed in the reaction solvent, and the resulting mixture brought with stirring to a pH of from about 6 to about 9 by the addition of alkaline reagent in an amount about equimolar with the employed chloroacetic acid reagent. Stirring is thereafter continued and the reaction mixture heated at a temperature of from 80 to 100° C. for a period of time to complete the reaction, and the production of the intermediate condensation product. During the course of the reaction, the reaction mixture is maintained at a pH of from about 6 to about 9 by the successive and portionwise addition of alkaline reagent.

In the second step of the present method, the intermediate condensation product prepared as above described is acidified with a mineral acid such as sulfuric acid or hydrochloric acid and brought to a pH of from about 1 to 2. During the acidification, the desired product usually precipitates in the reaction mixture as a crystalline solid. Upon completion of the acidification, the reaction mixture may be cooled to precipitate the desired product or further product, and the product thereafter separated and purified by conventional methods.

The following examples illustrate the invention but are not to be construed as limiting:

*Example 1.*—6 - chloro - 3,4 - dihydro - 2 - oxo - 2H - 1,4-benzoxazine-4-acetic acid

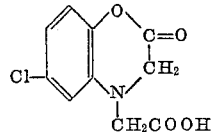

Sodium hydroxide (40 grams; 1.0 mole) was added portionwise with stirring to a mixture of 94.5 grams (1.0 mole) of monochloroacetic acid and 35.9 grams (0.25 mole) of 2-amino-4-chlorophenol dispersed in 200 milliliters of water. Stirring was thereafter continued and the mixture heated at the boiling temperature under reflux and in an atmosphere of nitrogen for three hours. During the heating, the reaction mixture was maintained at a pH of about 8 by the successive addition of aqueous 30 percent sodium hydroxide in the amount of about 0.9 mole of sodium hydroxide. The reaction mixture was then cooled to room temperature and thereafter acidified and brought to a pH of about 1 by the addition of aqueous 5-normal hydrochloric acid. During the acidification, a 6-chloro-3,4-dihydro-2-oxo-2H-1,4-benzoxazine-4-acetic acid product precipitated in the reaction mixture as a crystalline solid. This product was separated by filtration and recrystallized from aqueous 50 percent acetic acid. The recrystallized product melted at 217.5°–219.5° C.

*Example 2.*—3,4-dihydro-2-oxo-2H-1,4-benzoxazine-4-acetic acid

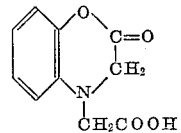

Sodium hydroxide (80 grams; 2.0 mole) was added portionwise with stirring to a mixture of 189 grams (2.0 moles) of monochloroacetic acid and 54.6 grams (0.5 mole) of 2-aminophenol dissolved in 500 milliliters of water. Stirring was thereafter continued and the mixture heated at the boiling temperature under reflux and in an atmosphere of nitrogen for two hours. During the heating, the reaction mixture was maintained at a pH of about 8 by the portionwise addition of aqueous 30 percent sodium hydroxide in the amount of about 1.0 mole of sodium hydroxide. The reaction mixture was then cooled to room temperature, and thereafter acidified and brought to a pH of about 1 by the addition of concentrated hydrochloric acid. The acidified mixture was then warmed for a half hour over a steam bath, and thereafter cooled. During the cooling, a 3,4-dihydro-2-oxo-2H-1,4-benzoxazine-4-acetic acid product precipitated as a crystalline solid and was separated by filtration and recrystallized from water. 3,4-Dihydro-2-oxo-2H-1,4-benzoxazine-4-acetic acid melts at 182.5° C.

*Example 3.—6 - chloro - 3,4-dihydro-8-methyl-2-oxo-2H-1,4-benzoxazine-4-acetic acid*

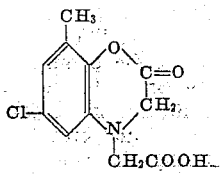

Sodium hydroxide (64 grams; 1.6 mole) was added portionwise with stirring to 151.1 grams (1.6 mole) of monochloroacetic acid and 63.1 grams (0.40 mole) of 6-amino-4-chloro-2-methylphenol dispersed in 320 milliliters of water. Stirring was thereafter continued and the mixture heated at the boiling temperature and under reflux and in an atmosphere of nitrogen for 5 hours. During the heating, the reaction mixture was maintained at a pH of about 7.0 by the succesive addition of 154 milliliters of aqueous 30 percent sodium hydroxide. The reaction mixture was then cooled to room temperature, diluted with water to a volume of 1500 milliliters, and the diluted mixture brough to a pH of about 10.5 by the addition of aqueous sodium hydroxide. The resulting mixture was thereafter filtered, and the filtrate acidified to a pH of about 1 by the addition of aqueous 5-normal hydrochloric acid. Toward the end of the acidification, a 6-chloro-3,4-dihydro-8-methyl-2-oxo-2H-1,4-benzoxazine-4-acetic acid product precipitated in the reaction mixture as a crystalline solid. This product was recrystallized from aqueous 50 percent acetic acid and dried. The dried product melted at 212–214.5° C.

*Example 4.—3,4 - dihydro - 6 - methyl - 2 - oxo - 2H - 1,4-benzoxazine-4-acetic acid*

Sodium hydroxide (2.0 moles) was added portionwise with stirring and under a nitrogen atmosphere to a mixture of 61.58 grams (0.5 mole) of 2-amino-4-methylphenol and 189.0 grams (2.0 moles) of monochloroacetic acid dispersed in 400 milliliters of water. Stirring was thereafter continued and the reaction mixture heated at the boiling temperature for four hours. During the heating the mixture was maintained at a pH of about 7 by the addition of 205 milliliters of aqueous 30 percent sodium hydroxide. The reaction mixture was then cooled to room temperature, acidified and brought to a pH of about 2 by the addition of aqueous 5-normal hydrochloric acid, and cooled to 30° C. During the cooling, a 3,4 - dihydro - 6 - methyl - 2-oxo-2H-1,4-benzoxazine-4-acetic acid product precipitated as a crystalline solid. This product was separated by filtration, recrystallized from aqueous 50 percent acetic acid, washed with water and dried. The dried product melted at 204°–206° C.

In a similar manner other 3,4-dihydro-2-oxo-2H-1,4-benzoxazine-4-acetic acid products may be prepared as follows:

6,8 - dichloro-3,4-dihydro-2-oxo-2H-1,4-benzoxazine-4-acetic acid by reacting together chloroacetic acid, 4,6-dichloro-2-aminophenol and hydrochloric acid.

8 - bromo - 3,4 - dihydro-2-oxo - 2H-1,4-benzoxazine-4-acetic acid by reacting together chloroacetic acid, 6-bromo-2-aminophenol and sulfuric acid.

6-propyl-8 - methyl-3,4-dihydro-2-oxo-2H-1,4-benzoxazine-4-acetic acid by reacting together chloroacetic acid, 4 propyl-6-methyl-2-aminophenol, and sulfuric acid.

8 - ethyl-3,4-dihydro-2-oxo-2H-1,4-benzoxazine-4-acetic acid by reacting together chloroacetic acid, 6-ethyl-2-aminophenol and sulfuric acid.

The novel compounds of this invenion are useful as parasiticides and are adapted to be employed for the control of many pests, such as insects and bacteria. For such use, the products may be dispersed on inert finely divided solids and employed as dusts. Also, such mixtures may be dispersed in water with the aid of a wetting agent and the resulting aqueous suspensions used as sprays or washes. In other procedures, the products may be employed in oil, as oil-in-water emulsions, or as water dispersions with or without the aid of dispersing or emulsifying agents. In representative operations, aqueous compositions containing one percent by weight of 3,4-dihydro-2-oxo - 2H - 1,4-benzoxazine-4-acetic acid have given complete inhibition of the growth of *Staphylococcus aureus*.

The substituted 2-aminophenols employed as starting materials as described herein may be prepared in known procedures by the reduction of the corresponding substituted 2-nitrophenols with sodium sulfite or sodium hydrogen sulfite.

We claim:

1. A compound corresponding to the formula

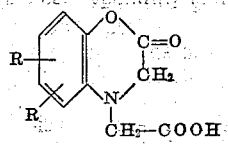

wherein each R represents a member selected from the group consisting of hydrogen, halogen, and loweralkyl.

2. 3,4-dihydro-2-oxo-2H-1,4-benzoxazine-4-acetic acid.

3. 6-chloro-3,4-dihydro-2-oxo-2H-1,4-benzoxazine - 4 - acetic acid.

4. 6-chloro-3,4-dihydro-8-methyl-2-oxo-2H - 1,4 - benzoxazine-4-acetic acid.

5. 3,4-dihydro-6-methyl-2-oxo-2H-1,4-benzoxazine - 4 - acetic acid.

6. A method for the production of a compound corresponding to the formula

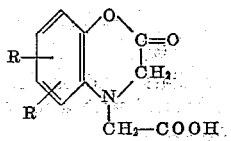

which comprises the steps of (1) reacting at least two molecular proportions of monochloroacetic acid with one molecular proportion of a 2-aminophenol having the formula

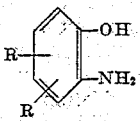

to produce an intermediate condensation product, said reaction being carried out in the presence of at least two molecular proportions of an alkaline reagent and under conditions such that the reaction mixture is maintained at a pH of from about 6 to about 9, and (2 acidifying said intermediate condensation product with a mineral acid, the substituents R in the formulae each representing a member selected from the group consisting of hydrogen, halogen, and loweralkyl.

No references cited.